(12) United States Patent
Youso et al.

(10) Patent No.: US 10,041,464 B2
(45) Date of Patent: Aug. 7, 2018

(54) CONTROLLER OF LASER IGNITION ENGINE

(71) Applicant: MAZDA MOTOR CORPORATION, Aki-gun, Hiroshima (JP)

(72) Inventors: Takashi Youso, Hiroshima (JP); Masahisa Yamakawa, Hiroshima (JP); Tatsuya Fujikawa, Hiroshima (JP); Atsushi Inoue, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/322,078

(22) PCT Filed: Jun. 24, 2015

(86) PCT No.: PCT/JP2015/003181
§ 371 (c)(1),
(2) Date: Dec. 23, 2016

(87) PCT Pub. No.: WO2016/002165
PCT Pub. Date: Jan. 7, 2016

(65) Prior Publication Data
US 2017/0159635 A1 Jun. 8, 2017

(30) Foreign Application Priority Data

Jul. 2, 2014 (JP) ................................ 2014-136563
Jul. 2, 2014 (JP) ................................ 2014-136564

(51) Int. Cl.
*F02P 23/04* (2006.01)
*F23Q 13/00* (2006.01)
*F02C 7/264* (2006.01)

(52) U.S. Cl.
CPC ............. *F02P 23/04* (2013.01); *F02C 7/264* (2013.01); *F23Q 13/005* (2013.01); *F23R 2900/00006* (2013.01)

(58) Field of Classification Search
CPC ........... F02P 23/04; F23Q 13/00; F02C 7/264; F23R 2900/00006
(Continued)

(56) References Cited

U.S. PATENT DOCUMENTS 4,892,075 A   1/1990 Iriyama et al.
7,420,662 B2 * 9/2008 Yalin .................... F02D 35/022
                                                356/317
(Continued)

FOREIGN PATENT DOCUMENTS

JP    S63253111 A   10/1988
JP    H0171646 U    5/1989
(Continued)

OTHER PUBLICATIONS

ISA Japan Patent Office, International Search Report Issued in Application No. PCT/JP2015/003181, dated Sep. 15, 2015, WIPO, 4 pages.
(Continued)

*Primary Examiner* — Hai Huynh
(74) *Attorney, Agent, or Firm* — Alleman Hall Creasman & Tuttle LLP

(57) ABSTRACT

A controller of a laser ignition engine configured to perform ignition by using a laser ignition device configured to emit a laser beam condensed by a lens includes: a combustion state related value acquiring portion configured to acquire a combustion state related value related to a combustion state of the engine; and a contamination determining portion configured to compare the combustion state related value acquired by the combustion state related value acquiring portion with a combustion state determining value to determine whether or not the laser ignition device is contaminated, the combustion state determining value being defined based on the combustion state of the engine when the laser ignition device is not contaminated.

1 Claim, 7 Drawing Sheets

(58) Field of Classification Search
USPC .................................... 123/143 B; 73/114.62
See application file for complete search history.

(56) References Cited

U.S. PATENT DOCUMENTS

| | | | |
|---|---|---|---|
| 8,783,221 B2* | 7/2014 | Woerner | F02P 23/04 |
| | | | 123/143 B |
| 9,212,970 B2* | 12/2015 | Martin | G01M 15/042 |
| 9,255,565 B2* | 2/2016 | Martin | F02P 23/04 |
| 9,316,200 B2* | 4/2016 | Woerner | F02P 23/04 |

FOREIGN PATENT DOCUMENTS

| | | | |
|---|---|---|---|
| JP | H048844 | A | 1/1992 |
| JP | H04347374 | A | 12/1992 |
| JP | H05223002 | A | 8/1993 |
| JP | 2006132334 | A | 5/2006 |
| JP | 2010116841 | A | 5/2010 |
| JP | 2013007391 | A | 1/2013 |

OTHER PUBLICATIONS

IPEA Japan Patent Office, International Preliminary Report on Patentability Issued in Application No. PCT/JP2015/003181, dated Dec. 23, 2016, WIPO, 7 pages.

\* cited by examiner

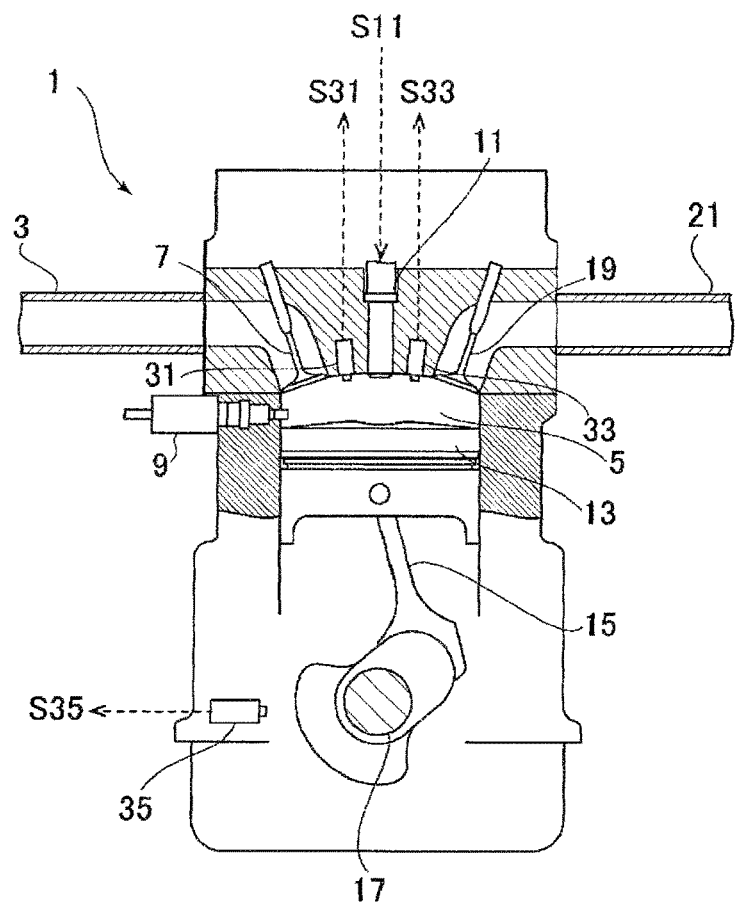
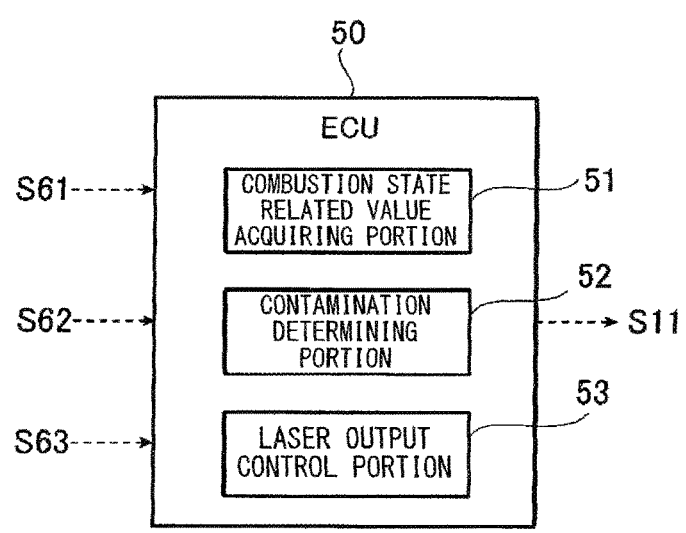
Fig. 1

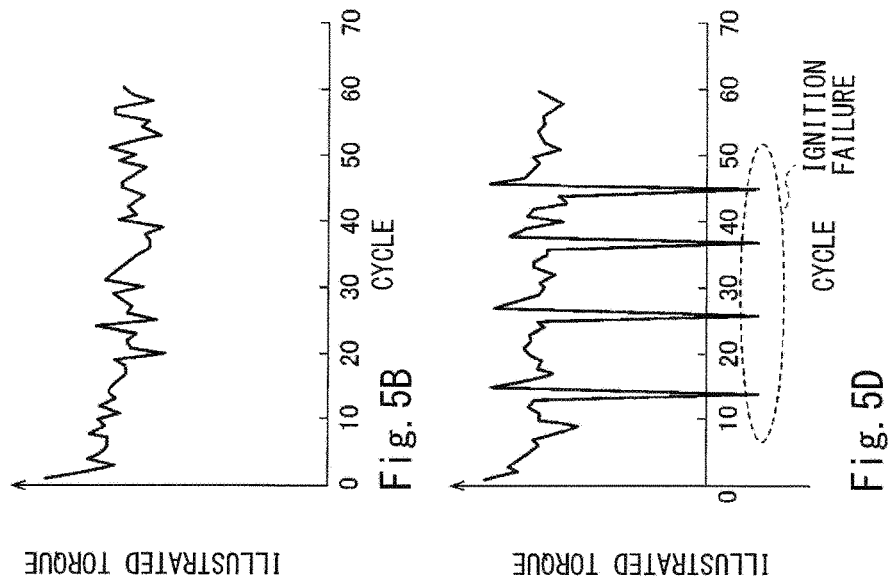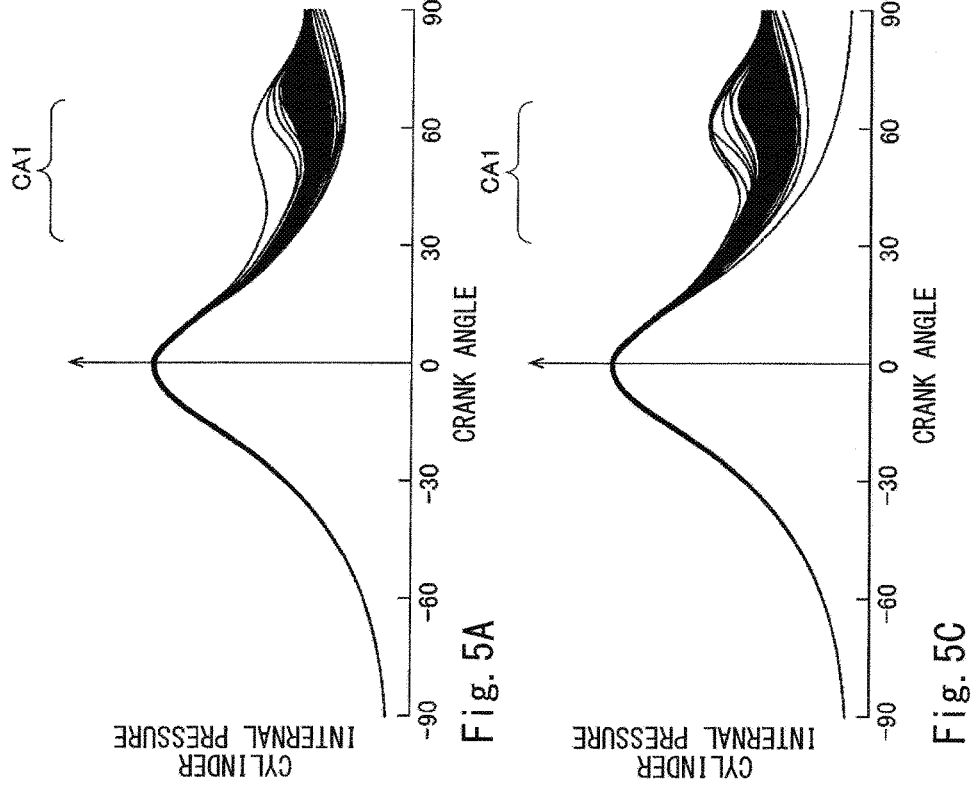

CONTROLLER OF LASER IGNITION ENGINE

TECHNICAL FIELD

The present invention relates to a controller of a laser ignition engine and particularly to a controller of a laser ignition engine that performs ignition by using a laser ignition device configured to emit a laser beam condensed by a lens.

BACKGROUND ART

Conventionally known as an ignition device of an engine is a laser ignition device configured to condense by a lens a laser beam generated by a laser beam source and ignite an air-fuel mixture in a combustion chamber by the condensed laser beam (see PTL 1, for example).

CITATION LIST

Patent Literature

PTL 1: Japanese Laid-Open Patent Application Publication No. 63-253111

SUMMARY OF INVENTION

Technical Problem

According to the above laser ignition device, oil or the like may be attached to parts (such as a lens, an optical window, and a communication passage) that guides the laser beam to the combustion chamber, and contamination may occur. In this case, there is a possibility that: the passing of the laser beam is inhibited by stain; the energy of the laser beam emitted from the laser ignition device decreases; and the air-fuel mixture in the combustion chamber is less likely to be ignited. Therefore, if the laser ignition device is contaminated, it is desirable to take some kind of countermeasure against the contamination. For example, a control operation (contamination removal control operation) of removing the contamination of the laser ignition device may be performed. One example of the contamination removal control operation is a control operation of increasing a laser output of the laser ignition device. However, such contamination removal control operation consumes excess energy. Therefore, it is desirable to perform the contamination removal control operation only when the laser ignition device is contaminated. In order to do this, it is necessary to accurately determine whether or not the laser ignition device is contaminated.

The present invention was made to solve the above problems of the prior arts, and an object of the present invention is to provide a controller of a laser ignition engine, the controller being capable of accurately determining whether or not the laser ignition device is contaminated and taking a countermeasure against the contamination at an appropriate timing. Further, the present invention was made to solve the above problems of the prior arts, and another object of the present invention is to provide a controller of a laser ignition engine, the controller being capable of appropriately suppressing a case where when the laser ignition device is contaminated, an air-fuel mixture is less likely to be ignited.

Solution to Problem

To achieve the above objects, the present invention is a controller of a laser ignition engine configured to perform ignition by using a laser ignition device configured to emit a laser beam condensed by a lens, the controller including: a combustion state related value acquiring portion configured to acquire a combustion state related value related to a combustion state of the engine; and a contamination determining portion configured to compare the combustion state related value acquired by the combustion state related value acquiring portion with a combustion state determining value to determine whether or not the laser ignition device is contaminated, the combustion state determining value being defined based on the combustion state of the engine when the laser ignition device is not contaminated.

In the present invention configured as above, in consideration that the combustion state of the engine is different between when the laser ignition device is contaminated and when the laser ignition device is not contaminated, whether or not the laser ignition device is contaminated is determined based on the combustion state related value related to the combustion state of the engine. Therefore, the contamination of the laser ignition device can be accurately determined. Thus, according to the present invention, the countermeasure against the contamination of the laser ignition device can be taken at an appropriate timing, and wasteful energy consumption can be suppressed.

In the present invention, it is preferable that: the combustion state related value acquiring portion acquire, as the combustion state related value, cylinder internal pressure detected by a cylinder internal pressure sensor provided at the engine; the contamination determining portion use, as the combustion state determining value, a cylinder internal pressure determining value defined based on the cylinder internal pressure obtained at a time of combustion when the laser ignition device is not contaminated; and when the cylinder internal pressure acquired by the combustion state related value acquiring portion at the time of the combustion is not more than the cylinder internal pressure determining value, the contamination determining portion determine that the laser ignition device is contaminated.

In the present invention configured as above, in consideration that cooling loss when the laser ignition device is contaminated is larger than that when the laser ignition device is not contaminated, and the cylinder internal pressure at the time of the combustion decreases, when the cylinder internal pressure acquired at the time of the combustion is not more than the cylinder internal pressure determining value, the contamination determining portion determines that the laser ignition device is contaminated. Therefore, the contamination of the laser ignition device can be accurately determined.

In the present invention, it is preferable that: the combustion state related value acquiring portion acquire, as the combustion state related value, an ion current detected by an ion current sensor provided at the engine; and the contamination determining portion use, as the combustion state determining value, a timing determining value defined based on a timing at which the ion current reaches a predetermined value when the laser ignition device is not contaminated, and when the timing at which the ion current acquired by the combustion state related value acquiring portion reaches the predetermined value is later than the timing determining value, the contamination determining portion determine that the laser ignition device is contaminated, or the contamination determining portion use, as the combustion state determining value, an ion current determining value defined based on the ion current obtained at a time of combustion when the laser ignition device is not contaminated, and when the ion current acquired by the combustion state related value acquiring portion at the time of the combustion is not more than the ion current determining value, the contamination determining portion determine that the laser ignition device is contaminated.

In the present invention configured as above, in consideration that an ignition point when the laser ignition device is contaminated is displaced toward the piston from the ignition point when the laser ignition device is not contaminated, and the timing at which the ion current is detected is late, when the timing at which the ion current reaches the predetermined value is later than the timing determining value, the contamination determining portion determines that the laser ignition device is contaminated. Therefore, the contamination of the laser ignition device can be accurately determined. Or, in consideration that the cooling loss when the laser ignition device is contaminated is larger than that when the laser ignition device is not contaminated, and the ion current decreases, when the acquired ion current is not more than the ion current determining value, the contamination determining portion determines that the laser ignition device is contaminated. Therefore, the contamination of the laser ignition device can be accurately determined.

In the present invention, it is preferable that: the combustion state related value acquiring portion acquire, as the combustion state related value, a crank angle signal from a crank angle sensor provided at the engine; the contamination determining portion use, as the combustion state determining value, a pulse width determining value defined based on a pulse width of the crank angle signal obtained at a time of combustion when the laser ignition device is not contaminated; and when the pulse width of the crank angle signal acquired by the combustion state related value acquiring portion at the time of the combustion is not less than the pulse width determining value, the contamination determining portion determine that the laser ignition device is contaminated.

In the present invention configured as above, in consideration that the cooling loss when the laser ignition device is contaminated is larger than that when the laser ignition device is not contaminated, and the pulse width of the crank angle signal at the time of the combustion increases, when the pulse width of the crank angle signal acquired at the time of the combustion is not less than the pulse width determining value, the contamination determining portion determines that the laser ignition device is contaminated. Therefore, the contamination of the laser ignition device can be accurately determined.

Further, to achieve the above objects, the present invention is a controller of a laser ignition engine configured to perform ignition by using a laser ignition device configured to emit a laser beam condensed by a lens, the controller including: a contamination determining portion configured to determine whether or not the laser ignition device is contaminated; and a laser output control portion configured to set a laser output of the laser ignition device to a reference laser output when the contamination determining portion determines that the laser ignition device is not contaminated and increase the laser output of the laser ignition device to more than at least the reference laser output when the contamination determining portion determines that the laser ignition device is contaminated.

In the present invention configured as above, when the contamination determining portion determines that the laser ignition device is contaminated, the laser output control portion increases the laser output of the laser ignition device to more than the reference laser output used when the laser ignition device is not contaminated. Therefore, the air-fuel mixture in the combustion chamber can be surely ignited.

In the present invention, it is preferable that: the engine be a compression self-ignition gasoline engine configured to perform compression self-ignition combustion that is combustion by self-ignition of an air-fuel mixture in a predetermined first operation range and perform spark ignition combustion that is forced combustion by ignition of the laser ignition device in a second operation range different from the first operation range; and when the engine performs the compression self-ignition combustion continuously for a predetermined time or more, the contamination determining portion determine that the laser ignition device is contaminated.

In the present invention configured as above, in consideration that the laser ignition device tends to be contaminated when the compression self-ignition combustion is performed in the compression self-ignition gasoline engine, when the compression self-ignition combustion is performed continuously for a predetermined time or more, the contamination determining portion determines that the laser ignition device is contaminated. Therefore, the contamination of the laser ignition device can be accurately determined. On this account, according to the present invention, the control operation of increasing the laser output of the laser ignition device to more than the reference laser output can be performed at an appropriate timing, and wasteful energy consumption can be suppressed.

In the present invention, it is preferable that: when the contamination determining portion determines that the laser ignition device is contaminated, the laser output control portion increase the laser output of the laser ignition device to a laser output by which contamination of the laser ignition device is removed; and after the contamination of the laser ignition device is removed, the laser output control portion return the laser output of the laser ignition device to the reference laser output.

In the present invention configured as above, when the contamination determining portion determines that the laser ignition device is contaminated, the laser output control portion increases the laser output of the laser ignition device to a high laser output by which the contamination can be removed. With this, the contamination of the laser ignition device can be appropriately removed. Further, according to the present invention, after the contamination of the laser ignition device is removed, the laser output control portion returns the laser output to the reference laser output. Therefore, wasteful energy consumption caused by continuously using the high laser output can be suppressed.

In the present invention, it is preferable that the controller further include a combustion state related value acquiring portion configured to acquire a combustion state related value related to a combustion state of the engine, wherein the contamination determining portion compare the combustion state related value acquired by the combustion state related value acquiring portion with a combustion state determining value to determine whether or not the laser ignition device is contaminated, the combustion state determining value being defined based on the combustion state of the engine when the laser ignition device is not contaminated.

In the present invention configured as above, in consideration that the combustion state of the engine is different between when the laser ignition device is contaminated and when the laser ignition device is not contaminated, whether or not the laser ignition device is contaminated is determined based on the combustion state related value related to the combustion state of the engine. Therefore, the contamination of the laser ignition device can be accurately determined. On this account, according to the present invention, the control operation of increasing the laser output of the laser ignition device to more than the reference laser output can be performed at an appropriate timing, and wasteful energy consumption can be suppressed.

Advantageous Effects of Invention

According to the controller of the laser ignition engine of the present invention, whether or not the laser ignition device is contaminated can be accurately determined, and the countermeasure against the contamination can be executed at an appropriate timing. Further, according to the controller of the laser ignition engine of the present invention, a case where it is difficult to ignite the air-fuel mixture when the laser ignition device is contaminated can be appropriately suppressed.

BRIEF DESCRIPTION OF DRAWINGS

FIG. 1 is a schematic configuration diagram showing an engine according to an embodiment of the present invention.

FIG. 5 is a diagram showing specific examples of cylinder internal pressure obtained when the laser ignition device according to the embodiment of the present invention is contaminated and is not contaminated.

DESCRIPTION OF EMBODIMENTS

Hereinafter, a controller of a laser ignition engine according to an embodiment of the present invention will be explained in reference to the attached drawings.

1. Device Configuration

Figure 2A:
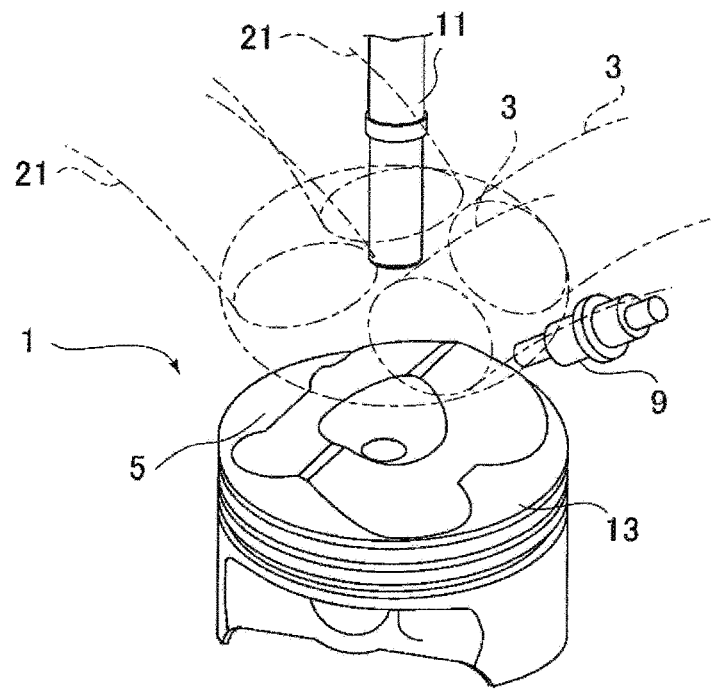
FIG. 2A is a perspective view showing the engine according to the embodiment of the present invention when the engine is viewed from above.
Figure 2B:
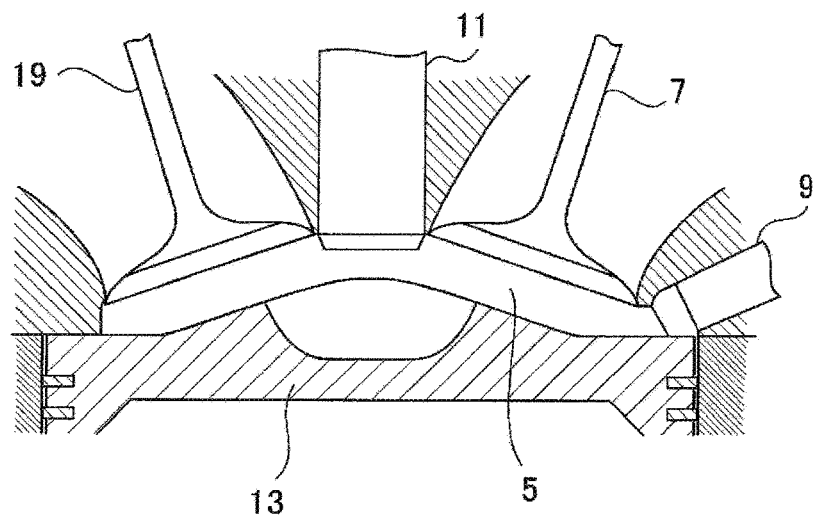
FIG. 2B is a partially cross-sectional view showing the engine.

First, the configuration of an engine to which the controller of the laser ignition engine according to the embodiment of the present invention is applied will be explained in reference to FIGS. 1, 2A, and 2B. FIG. 1 is a schematic configuration diagram showing the engine according to the embodiment of the present invention. FIG. 2A is a perspective view showing the engine when the engine is viewed from above (a part of the engine is shown in perspective). FIG. 2B is a partially cross-sectional view showing the engine.

In FIG. 1, an intake side is shown at the left, and an exhaust side is shown at the right. However, in FIGS. 2A and 2B, unlike FIG. 1, the intake side is shown at the right, and the exhaust side is shown at the left. Further, in FIGS. 2A and 2B, components of the engine are suitably omitted for convenience of explanation.

As shown in FIG. 1, an engine 1 is an internal combustion engine configured to: be supplied with an intake gas (air) from an intake passage 3; combust an air-fuel mixture, containing the intake gas and a fuel, to generate power of a vehicle; and discharge an exhaust gas, generated by this combustion, through an the exhaust passage 21. For example, the engine 1 is a gasoline engine.

Specifically, the engine 1 mainly includes: an intake valve 7 (see FIG. 2B; not shown in FIG. 2A) through which the intake gas supplied from the intake passage 3 is introduced to a combustion chamber 5; a fuel injection valve 9 (see FIGS. 2A and 2B) configured to inject the fuel to the combustion chamber 5; a laser ignition device 11 (see FIGS. 2A and 2B) configured to emit a laser beam to ignite the air-fuel mixture containing the intake gas and the fuel supplied to the combustion chamber 5; a piston 13 configured to perform a reciprocating movement by the combustion of the air-fuel mixture in the combustion chamber 5; a connecting rod 15 including one end connected to the piston 13; a crank shaft 17 to which the other end of the connecting rod 15 is connected and which is rotated by the reciprocating movement of the piston 13; and an exhaust valve 19 (see FIG. 2B; not shown in FIG. 2A) through which the exhaust gas generated by the combustion of the air-fuel mixture in the combustion chamber 5 is discharged to an exhaust passage 21.

Further, the engine 1 is provided with: a cylinder internal pressure sensor 31 configured to detect cylinder internal pressure that is pressure in a cylinder and output a detection signal S31 corresponding to the cylinder internal pressure; an ion current sensor 33 configured to detect an ion current (generated at the time of the combustion) generated in the cylinder and output a detection signal S33 corresponding to the ion current; and a crank angle sensor 35 configured to detect a crank angle corresponding to a rotation angle of the crank shaft 17 and output a detection signal S35 corresponding to the crank angle. Specifically, as the detection signal S35, the crank angle sensor 35 outputs a pulse-shaped signal (hereinafter suitably referred to as a "crank angle signal") corresponding to the crank angle.

In the engine 1, an ECU (Electronic Control Unit) 50 performs various control operations. In terms of function, the ECU 50 includes a combustion state related value acquiring portion 51, a contamination determining portion 52, and a laser output control portion 53.

As a combustion state related value indicating a combustion state of the engine 1, the combustion state related value acquiring portion 51 of the ECU 50 acquires at least one of: the cylinder internal pressure (corresponding to the detection signal S31) detected by the cylinder internal pressure sensor 31; the ion current (corresponding to the detection signal S33) detected by the ion current sensor 33; and the crank angle (corresponding to the detection signal S35 as the crank angle signal) detected by the crank angle sensor 35.

Based on the combustion state related value acquired by the combustion state related value acquiring portion 51 as above, the contamination determining portion 52 of the ECU 50 determines whether or not the laser ignition device 11 is contaminated.

The laser output control portion 53 of the ECU 50 controls a laser output of the laser ignition device 11 in accordance with a result of the determination by the contamination determining portion 52. In this case, the laser output control portion 53 supplies a control signal S11 to the laser ignition device 11 to control the laser output.

As explained above, the ECU 50 corresponds to "the controller of the laser ignition engine" in the present invention.

The ECU 50 is constituted by a computer including: a CPU; various programs (including a basic control program such as an OS and application programs started up on the OS and realizing specific functions) interpreted and executed on the CPU; and an internal memory, such as a ROM or a RAM, storing the programs and various data.

Figure 3:
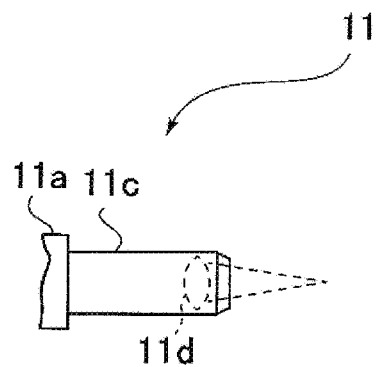
FIG. 3 is a plan view schematically showing a laser ignition device according to the embodiment of the present invention.

Next, the laser ignition device 11 according to the embodiment of the present invention will be specifically explained in reference to FIG. 3. FIG. 3 is a plan view schematically showing the laser ignition device 11 according to the embodiment of the present invention.

As shown in FIG. 3, the laser ignition device 11 mainly includes: a laser beam source 11a, such as a semiconductor laser, configured to oscillate the laser beam; and a laser emitting portion 11c configured to emit the laser beam, oscillated from the laser beam source 11a, to the outside. Specifically, a lens 11d as a condensing lens is provided in the vicinity of a tip end portion of the laser emitting portion 11c. The laser emitting portion 11c emits to the outside the laser beam obtained by condensing by the lens 11d the laser beam as parallel light oscillated from the laser beam source 11a. The lens 11d is configured to condense the laser beam at a position outside the laser ignition device 11, that is, form a focus at a position outside the laser ignition device 11.

2. Contamination Determining Method

The following will explain a method (contamination determining method) of determining the contamination of the laser ignition device 11, the method being executed by the contamination determining portion 52 of the ECU 50 in the embodiment of the present invention.

As described above, the laser ignition device 11 may be contaminated, that is, stain such as oil may be attached to a portion (such as the lens 11d) of the laser ignition device 11 which portion is located in the combustion chamber 5. When the laser ignition device 11 is contaminated (for example, when the lens 11d is stained), the passing of the laser beam is inhibited by the stain. With this, the combustion state of the engine 1 tends to change from the combustion state of the engine 1 when the laser ignition device 11 is not contaminated.

Figure 4:
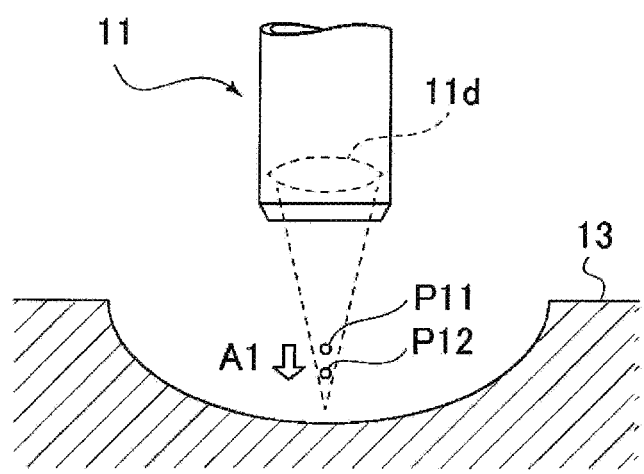
FIG. 4 is an explanatory diagram for explaining a reason why a combustion state of the engine changes when the laser ignition device according to the embodiment of the present invention is contaminated and an enlarged view showing a part of the laser ignition device and a part of a piston.

A reason why the combustion state of the engine 1 changes when the laser ignition device 11 is contaminated will be specifically explained in reference to FIG. 4. FIG. 4 is an enlarged view showing a part of the engine 1 according to the embodiment of the present invention, specifically showing a part of the laser ignition device 11 and a part of the piston 13.

As shown in FIG. 4, when the laser ignition device 11 is not contaminated, the ignition is performed at a position P11 by the laser beam emitted from the laser ignition device 11. To be specific, the position P11 is an ignition point. In contrast, when the laser ignition device 11 is contaminated, the passing of the laser beam is inhibited by the stain, such as oil, attached to the lens 11d or the like, and the energy of the laser beam emitted from the laser ignition device 11 decreases. Therefore, as shown by an arrow A1 in FIG. 4, the ignition is performed at a position P12 that is moved toward the piston 13 (i.e., toward the focus of the lens 11d) from the ignition point P11 that is the ignition point when the laser ignition device 11 is not contaminated. When the degree of the contamination of the laser ignition device 11 is high, the ignition may not be performed, that is, an ignition failure may occur.

Therefore, the combustion state of the engine 1 when the laser ignition device 11 is contaminated changes from that when the laser ignition device 11 is not contaminated. On this account, in the present embodiment, the contamination of the laser ignition device 11 is determined based on the combustion state of the engine 1. Specifically, the combustion state related value acquiring portion 51 of the ECU 50 acquires the combustion state related value indicating the combustion state of the engine 1, and based on this combustion state related value, the contamination determining portion 52 of the ECU 50 determines whether or not the laser ignition device 11 is contaminated. In this case, a combustion state determining value for determining the combustion state related value is defined in advance based on the combustion state of the engine 1 when the laser ignition device 11 is not contaminated. Then, when the combustion state related value acquired by the combustion state related value acquiring portion 51 is different from the combustion state determining value, the contamination determining portion 52 determines that the laser ignition device 11 is contaminated.

Hereinafter, a specific example of the contamination determining method according to the embodiment of the present invention will be explained.

2-1. Example 1 of Contamination Determining Method

First, Example 1 of the contamination determining method according to the present embodiment will be explained. In summary, in Example 1, the combustion state related value acquiring portion 51 of the ECU 50 acquires as the combustion state related value the cylinder internal pressure detected by the cylinder internal pressure sensor 31, and the contamination determining portion 52 of the ECU 50 uses as the combustion state determining value a cylinder internal pressure determining value defined based on the cylinder internal pressure obtained at the time of the combustion when the laser ignition device 11 is not contaminated. Then, the contamination determining portion 52 of the ECU 50 compares the cylinder internal pressure acquired by the combustion state related value acquiring portion 51 at the time of the combustion with the cylinder internal pressure determining value to determine whether or not the laser ignition device 11 is contaminated.

In reference to FIG. 5A to 5D, specific examples of the cylinder internal pressure actually obtained when the laser ignition device 11 is contaminated and the cylinder internal pressure actually obtained when the laser ignition device 11 is not contaminated will be shown, and a difference between the cylinder internal pressure when the laser ignition device 11 is contaminated and the cylinder internal pressure when the laser ignition device 11 is not contaminated will be explained.

FIG. 5A shows that 60 cycles of the change in the cylinder internal pressure with respect to the crank angle when the laser ignition device 11 is not contaminated overlap one another. FIG. 5B shows 60 cycles of illustrated torque when the laser ignition device 11 is not contaminated. FIG. 5C shows that 60 cycles of the change in the cylinder internal pressure with respect to the crank angle when the laser ignition device 11 is contaminated overlap one another. FIG. 5D shows 60 cycles of the illustrated torque when the laser ignition device 11 is contaminated.

It should be noted that FIGS. 5A to 5D show examples of results obtained when an engine speed and an engine load are constant. Further, FIGS. 5C and 5D show examples of results obtained when the degree of the contamination of the laser ignition device 11 is relatively high. The combustion is generated in the engine 1 in a crank angle range shown by a reference sign CA1 in each of FIGS. 5A and 5C.

According to a comparison between the results shown in FIGS. 5A and 5B and the results shown in FIGS. 5C and 5D, the cylinder internal pressure at the time of the combustion is different between when the laser ignition device 11 is not contaminated and when the laser ignition device 11 is contaminated. Specifically, there are cycles in each of which the cylinder internal pressure at the time of the combustion when the laser ignition device 11 is contaminated is lower than that when the laser ignition device 11 is not contaminated. Especially, as shown in FIG. 5D (see a broken-line region), there are cycles in each of which the ignition failure has occurred when the laser ignition device 11 is contaminated.

In Example 1 of the contamination determining method according to the present embodiment, in consideration of the difference between the cylinder internal pressure at the time of the combustion when the laser ignition device 11 is contaminated and the cylinder internal pressure at the time of the combustion when the laser ignition device 11 is not contaminated as shown in FIGS. 5A to 5D, the contamination of the laser ignition device 11 is determined based on the cylinder internal pressure.

Figure 6:
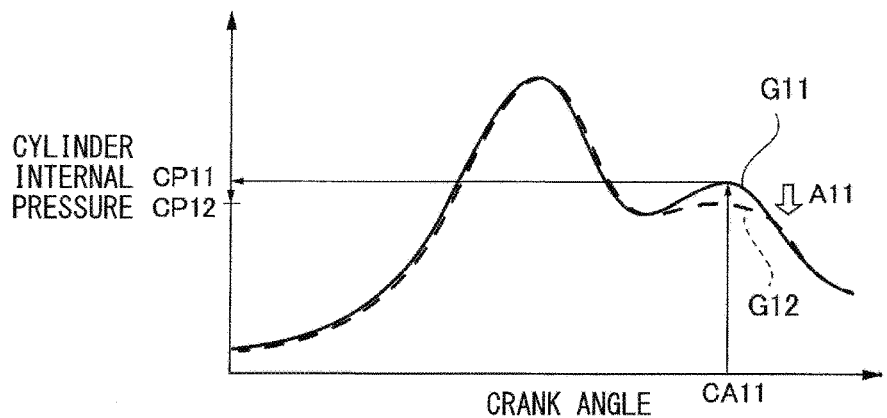
FIG. 6 is an explanatory diagram showing Example 1 of a contamination determining method according to the embodiment of the present invention.

Next, Example 1 of the contamination determining method according to the present embodiment will be specifically explained in reference to FIG. 6.

In FIG. 6, a graph G11 shown by a solid line shows one example of the change in the cylinder internal pressure with respect to the crank angle when the laser ignition device 11 is not contaminated, and a graph G12 shown by a broken line shows one example of the change in the cylinder internal pressure with respect to the crank angle when the laser ignition device 11 is contaminated. The graph G12 shows the cylinder internal pressure obtained when the degree of the contamination of the laser ignition device 11 is relatively low (specifically, when the degree of the contamination is lower than that shown in FIGS. 5C and 5D).

As shown by an arrow A11 in FIG. 6, the cylinder internal pressure at the time of the combustion (in the vicinity of a crank angle CA11) when the laser ignition device 11 is contaminated tends to be lower than that when the laser ignition device 11 is not contaminated. This is because since the position of the ignition when the laser ignition device 11 is contaminated is closer to the piston 13 than the position of the ignition when the laser ignition device 11 is not contaminated (see FIG. 4), a timing at which flame by the ignition contacts the piston 13 becomes early, and cooling loss increases, and as a result, the cylinder internal pressure decreases.

Therefore, in Example 1 of the contamination determining method according to the present embodiment, the cylinder internal pressure determining value is set based on the cylinder internal pressure obtained at the time of the combustion when the laser ignition device 11 is not contaminated. Then, when the cylinder internal pressure actually detected by the cylinder internal pressure sensor 31 at the time of the combustion is not more than the cylinder internal pressure determining value, it is determined that the laser ignition device 11 is contaminated. Specifically, as shown in FIG. 6, based on a cylinder internal pressure CP11 obtained at the corresponding crank angle CA11 at the time of the combustion when the laser ignition device 11 is not contaminated, cylinder internal pressure CP12 lower than the cylinder internal pressure CP11 by a predetermined value is set as the cylinder internal pressure determining value. Then, when the cylinder internal pressure (i.e., the cylinder internal pressure detected by the cylinder internal pressure sensor 31) acquired by the combustion state related value acquiring portion 51 of the ECU 50 at the corresponding crank angle CA11 at the time of the combustion is not more than the cylinder internal pressure determining value CP12, the contamination determining portion 52 of the ECU 50 determines that the laser ignition device 11 is contaminated.

It should be noted that the cylinder internal pressure determining value CP12 is set also in consideration of an operating state of the engine 1. For example, the cylinder internal pressure determining value CP12 is set in consideration of the load of the engine 1, the flow rate (EGR amount) of the exhaust gas returned from an exhaust system to an intake system, and the like. This is because: the magnitude of the cylinder internal pressure fluctuates depending on the operating state of the engine 1; and therefore, if the same cylinder internal pressure determining value CP12 is used for the different operating states, the contamination of the laser ignition device 11 may be erroneously determined. One example is that: a map is prepared, in which the cylinder internal pressure determining values CP12 are defined for the respective operating states of the engine 1; and the contamination determining portion 52 refers to the map to adopt the cylinder internal pressure determining value CP12 corresponding to the current operating state of the engine 1.

In Example 1, whether or not the laser ignition device 11 is contaminated is determined. However, in addition to this, the degree of the contamination of the laser ignition device 11 may be further determined. For example, the degree of the contamination of the laser ignition device 11 may be determined based on the amount of difference of the cylinder internal pressure, acquired by the combustion state related value acquiring portion 51, from the cylinder internal pressure determining value CP12.

2-2. Example 2 of Contamination Determining Method

Next, Example 2 of the contamination determining method according to the present embodiment will be explained. In summary, in Example 2, the combustion state related value acquiring portion 51 of the ECU 50 acquires as the combustion state related value the ion current detected by the ion current sensor 33, and the contamination determining portion 52 of the ECU 50 uses as the combustion state determining value a timing determining value defined based on a timing at which the ion current reaches a predetermined value when the laser ignition device 11 is not contaminated. Then, the contamination determining portion 52 of the ECU 50 compares the timing at which the ion current actually acquired by the combustion state related value acquiring portion 51 reaches the predetermined value with the timing determining value to determine whether or not the laser ignition device 11 is contaminated.

Figure 7:
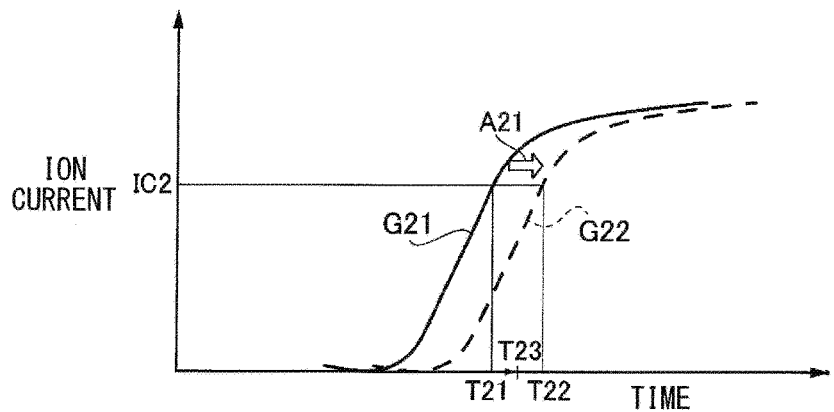
FIG. 7 is an explanatory diagram showing Example 2 of the contamination determining method according to the embodiment of the present invention.

Example 2 of the contamination determining method according to the present embodiment will be specifically explained in reference to FIG. 7. In FIG. 7, a graph G21 shown by a solid line shows one example of a time change of the ion current when the laser ignition device 11 is not contaminated, and a graph G22 shown by a broken line shows one example of the time change of the ion current when the laser ignition device 11 is contaminated. The graph G22 shows the ion current obtained when the degree of the contamination of the laser ignition device 11 is relatively low.

As shown in FIG. 7, when the laser ignition device 11 is not contaminated, the ion current reaches a predetermined value IC2 (for example, a value when the ion current is increased to some extend by the combustion) at a timing T21. On the other hand, when the laser ignition device 11 is contaminated, the ion current reaches the predetermined value IC2 at a timing T22 that is later than the timing T21 (It should be noted that the timings T21 and T22 are defined based on, for example, a timing at which the crank angle becomes a compression top. The same applies to a below-described timing T23). To be specific, as shown by an arrow A21 in FIG. 7, the timing at which the ion current reaches the predetermined value IC2 when the laser ignition device 11 is contaminated tends to be later than the timing at which the ion current reaches the predetermined value IC2 when the laser ignition device 11 is not contaminated. This is because since the position of the ignition when the laser ignition device 11 is contaminated is closer to the piston 13 than the position of the ignition when the laser ignition device 11 is not contaminated (see FIG. 4), it takes time for the flame by the ignition to reach the ion current sensor 33.

Therefore, in Example 2 of the contamination determining method according to the present embodiment, based on the timing T21 at which the ion current reaches the predetermined value IC2 when the laser ignition device 11 is not contaminated, the timing T23 that is set to be later than the timing T21 by a predetermined time is set as the timing determining value. Then, when the timing at which the ion current (i.e., the ion current detected by the ion current sensor 33) acquired by the combustion state related value acquiring portion 51 of the ECU 50 reaches the predetermined value IC2 is later than the timing determining value T23, the contamination determining portion 52 of the ECU 50 determines that the laser ignition device 11 is contaminated.

It should be noted that there is a possibility that the ion current does not reach the predetermined value IC2 when the degree of the contamination of the laser ignition device 11 is high (in this case, the timing at which the ion current reaches the predetermined value IC2 cannot be obtained). When the ion current does not reach the predetermined value IC2 as above, it is preferable to determine that the laser ignition device 11 is contaminated.

A modified version of Example 2 of the contamination determining method according to the present embodiment will be explained. In the modified version of Example 2, instead of the timing determining value T23, the ion current determining value defined based on the ion current obtained when the laser ignition device 11 is not contaminated is used as the combustion state determining value. Then, the contamination determining portion 52 of the ECU 50 compares the ion current acquired by the combustion state related value acquiring portion 51 with the ion current determining value to determine whether or not the laser ignition device 11 is contaminated.

Figure 8:
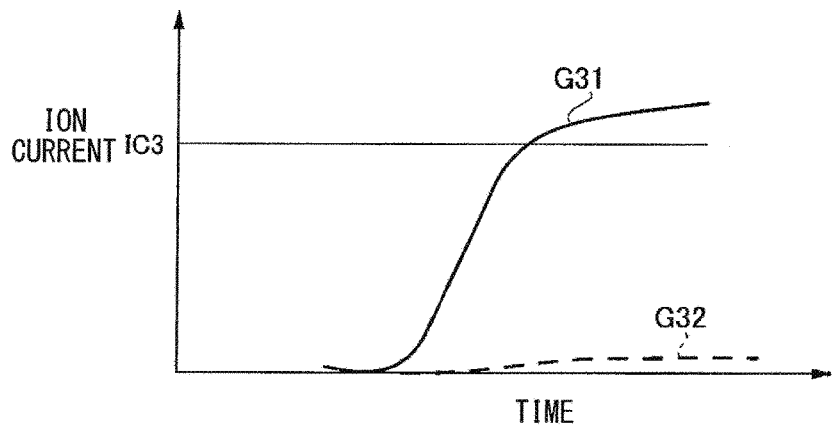
FIG. 8 is an explanatory diagram showing a modified version of Example 2 of the contamination determining method according to the embodiment of the present invention.

The modified version of Example 2 of the contamination determining method according to the present embodiment will be explained in reference to FIG. 8. In FIG. 8, a graph G31 shown by a solid line shows one example of a time change of the ion current when the laser ignition device 11 is not contaminated, and a graph G32 shown by a broken line shows one example of the time change of the ion current when the laser ignition device 11 is contaminated. The graph G32 shows the ion current obtained when the degree of the contamination of the laser ignition device 11 is significantly high (specifically, when the degree of the contamination of the laser ignition device 11 is significantly higher than that shown in FIG. 7).

As shown in FIG. 8, the ion current when the laser ignition device 11 is contaminated is lower than the ion current when the laser ignition device 11 is not contaminated. More specifically, in this case, the degree of the contamination of the laser ignition device 11 is significantly high, so that the ignition failure occurs in the engine 1, and the ion current is not almost detected by the ion current sensor 33.

In the modified version of Example 2 of the contamination determining method according to the present embodiment, as shown in FIG. 8, a value smaller by a predetermined value than the ion current obtained at the time of the combustion when the laser ignition device 11 is not contaminated is set as an ion current determining value IC3. Then, when the ion current (i.e., the ion current detected by the ion current sensor 33) acquired by the combustion state related value acquiring portion 51 of the ECU 50 at the time of the combustion is not more than the ion current determining value IC3, the contamination determining portion 52 of the ECU 50 determines that the laser ignition device 11 is contaminated. For example, the ion current determining value IC3 is set as a value smaller by a predetermined value than the ion current obtained at a predetermined timing at the time of the combustion when the laser ignition device 11 is not contaminated. Then, when the ion current acquired by the combustion state related value acquiring portion 51 at the predetermined timing is not more than the ion current determining value IC3, the contamination determining portion 52 determines that the laser ignition device 11 is contaminated.

It should be noted that the timing determining value T23 and the ion current determining value IC3 used in Example 2 are set also in consideration of the operating state of the engine 1. For example, the timing determining value T23 and the ion current determining value IC3 are set in consideration of the load of the engine 1, the flow rate (EGR amount) of the exhaust gas returned from the exhaust system to the intake system, and the like. This is because: the magnitude of the ion current fluctuates depending on the operating state of the engine 1; and therefore, if the same timing determining value T23 or the same ion current determining value IC3 is used for the different operating states, the contamination of the laser ignition device 11 may be erroneously determined. One example is that: a map is prepared, in which the timing determining values T23 or the ion current determining values IC3 are defined for the respective the operating states of the engine 1; and the contamination determining portion 52 refers to the map to adopt the timing determining value T23 corresponding to the current operating state of the engine 1 or the ion current determining value IC3 corresponding to the current operating state of the engine 1.

In Example 2, whether or not the laser ignition device 11 is contaminated is determined. However, in addition to this, the degree of the contamination of the laser ignition device 11 may be further determined. For example, the degree of the contamination of the laser ignition device 11 may be determined based on the amount of difference of the timing, at which the ion current acquired by the combustion state related value acquiring portion 51 reaches the predetermined value IC2, from the timing determining value T23 or the amount of difference of the ion current, acquired by the combustion state related value acquiring portion 51, from the ion current determining value IC3.

2-3. Example 3 of Contamination Determining Method

Next, Example 3 of the contamination determining method according to the present embodiment will be explained. In summary, in Example 3, the combustion state related value acquiring portion 51 of the ECU 50 acquires as the combustion state related value the crank angle signal from the crank angle sensor 35, and the contamination determining portion 52 of the ECU 50 uses as the combustion state determining value a pulse width determining value defined based on a pulse width of the crank angle signal obtained at the time of the combustion when the laser ignition device 11 is not contaminated. Then, the contamination determining portion 52 of the ECU 50 compares the pulse width of the crank angle signal, acquired by the combustion state related value acquiring portion 51 at the time of the combustion, with the pulse width determining value to determine whether or not the laser ignition device 11 is contaminated.

Figure 9:
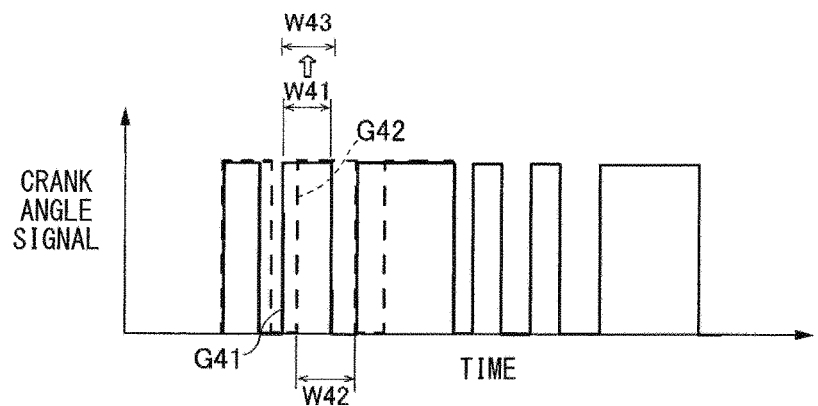
FIG. 9 is an explanatory diagram showing Example 3 of the contamination determining method according to the embodiment of the present invention.

Example 3 of the contamination determining method according to the present embodiment will be specifically explained in reference to FIG. 9. In FIG. 9, a graph G41 shown by a solid line shows one example of the crank angle signal at the time of the combustion when the laser ignition device 11 is not contaminated, and a graph G42 shown by a broken line shows one example of the crank angle signal at the time of the combustion when the laser ignition device 11 is contaminated.

As shown in FIG. 9, when the laser ignition device 11 is not contaminated, the crank angle signal at the time of the combustion has a pulse width W41. On the other hand, when the laser ignition device 11 is contaminated, the crank angle signal at the time of the combustion has a pulse width W42 larger than the pulse width W41. To be specific, the pulse width of the crank angle signal when the laser ignition device 11 is contaminated is larger than the pulse width of the crank angle signal when the laser ignition device 11 is not contaminated. This is because since the position of the ignition when the laser ignition device 11 is contaminated is closer to the piston 13 than the position of the ignition when the laser ignition device 11 is not contaminated (see FIG. 4), the timing at which the flame by the ignition contacts the piston 13 becomes early, and the cooling loss increases, and as a result, the rotating speed of the crank shaft 17 decreases.

Therefore, in Example 3 of the contamination determining method according to the present embodiment, as shown in FIG. 9, based on the pulse width W41 of the crank angle signal obtained at the time of the combustion when the laser ignition device 11 is not contaminated, a pulse width W43 larger than the pulse width W41 by a predetermined value is set as the pulse width determining value. Then, when the pulse width of the crank angle signal (i.e., the crank angle signal from the crank angle sensor 35) acquired by the combustion state related value acquiring portion 51 of the ECU 50 is not less than the pulse width determining value W43, the contamination determining portion 52 of the ECU 50 determines that the laser ignition device 11 is contaminated. It should be noted that there is a possibility that the ignition failure occurs when the degree of the contamination of the laser ignition device 11 is high. In this case, the pulse width of the acquired crank angle signal becomes large. Therefore, the contamination of the laser ignition device 11 can be accurately determined by using the pulse width determining value W43.

It should be noted that the pulse width determining value W43 is set also in consideration of the operating state of the engine 1. For example, the pulse width determining value W43 is set in consideration of the load of the engine 1, the flow rate (EGR amount) of the exhaust gas returned from the exhaust system to the intake system, and the like. This is because: the magnitude of the pulse width of the crank angle signal fluctuates depending on the operating state of the engine 1; and therefore, if the same pulse width determining value W43 is used for the different operating states, the contamination of the laser ignition device 11 may be erroneously determined. One example is that: a map is prepared, in which the pulse width determining values W43 are defined for the respective operating states of the engine 1; and the contamination determining portion 52 refers to the map to adopt the pulse width determining value W43 corresponding to the current operating state of the engine 1.

In Example 3, whether or not the laser ignition device 11 is contaminated is determined. However, in addition to this, the degree of the contamination of the laser ignition device 11 may be further determined. For example, the degree of the contamination of the laser ignition device 11 may be determined based on the amount of difference of the pulse width of the crank angle signal, acquired by the combustion state related value acquiring portion 51, from the pulse width determining value W43.

2-4. Example 4 of Contamination Determining Method

Next, Example 4 of the contamination determining method according to the present embodiment will be explained. In Examples 1 to 3 of the contamination determining method according to the present embodiment, in consideration that the combustion state of the engine 1 is different between when the laser ignition device 11 is contaminated and when the laser ignition device 11 is not contaminated, the combustion state related value related to the combustion state of the engine 1 is acquired from the cylinder internal pressure sensor 31, the ion current sensor 33, or the crank angle sensor 35, and the contamination of the laser ignition device 11 is determined based on the combustion state related value.

However, in Example 4 of the contamination determining method according to the present embodiment, the contamination of the laser ignition device 11 is determined based on an operation history of the engine 1. To be specific, in Example 4 of the contamination determining method according to the present embodiment, the contamination of the laser ignition device 11 is not determined by sensing, but the contamination of the laser ignition device 11 is determined based on the operation history of the engine 1, the operating history being a factor of the contamination of the laser ignition device 11. Specifically, Example 4 of the contamination determining method according to the present embodiment is applied to the engine 1 as a compression self-ignition gasoline engine that performs: compression self-ignition combustion that is combustion by self-ignition (HCCI; Homogeneous-Charge Compression Ignition) of the compressed air-fuel mixture; and spark ignition combustion that is forced combustion by ignition (SI; spark ignition). The contamination of the laser ignition device 11 is determined based on the operation history of the compression self-ignition gasoline engine.

Figure 10:
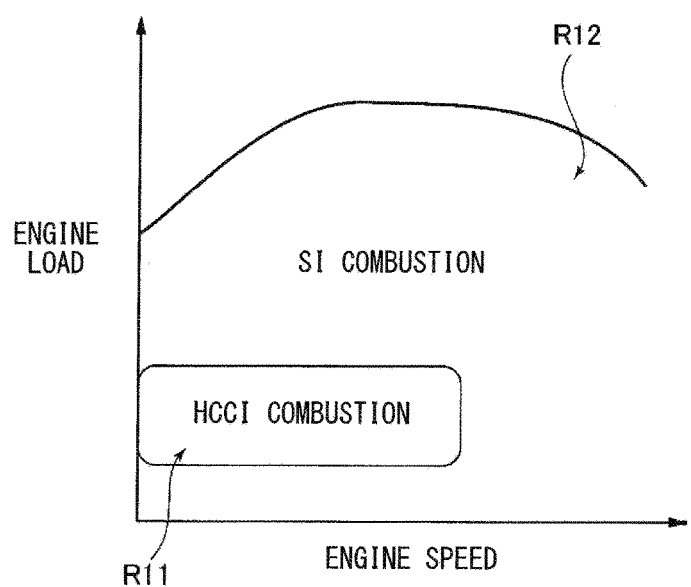
FIG. 10 is an explanatory diagram showing an operation range of compression self-ignition combustion and an operation range of spark ignition combustion in a compression self-ignition gasoline engine.

An operation range of the compression self-ignition combustion and an operation range of the spark ignition combustion in the compression self-ignition gasoline engine will be explained in reference to FIG. 10. In FIG. 10, a horizontal axis shows an engine speed, and a vertical axis shows an engine load. In FIG. 10, a region R11 shows the operation range (corresponding to a first operation range) where the compression self-ignition combustion (HCCI combustion) is performed, and a region R12 shows the operation range (corresponds to a second operation range) where the spark ignition combustion (SI combustion) is performed. When performing the compression self-ignition combustion, a compression ratio of the engine 1 is increased. However, when the compression ratio is high, it is difficult to perform ignition by a spark plug that utilizes dielectric breakdown. Therefore, when performing the compression self-ignition combustion, it is preferable to use the laser ignition device 11 that performs ignition by using the laser beam, as in the engine 1 shown in FIG. 1.

When the above compression self-ignition combustion is performed, a combustion temperature is low, so that the laser ignition device 11 tends to be contaminated. Therefore, in Example 4 of the contamination determining method according to the present embodiment, based on the history of the compression self-ignition combustion performed, the contamination determining portion 52 of the ECU 50 determines whether or not the laser ignition device 11 is contaminated. Specifically, when the compression self-ignition combustion in the engine 1 is performed continuously for a predetermined time or more, the contamination determining portion 52 uniquely determines that the laser ignition device 11 is contaminated. One example is that the contamination determining portion 52 determines the execution of the compression self-ignition combustion based on the engine speed and the engine load and determines whether or not the compression self-ignition combustion is performed continuously for the predetermined time or more. In another example, the contamination determining portion 52 determines that the combustion performed without driving the laser ignition device 11 is the compression self-ignition combustion and determines whether or not the compression self-ignition combustion is performed continuously for the predetermined time or more.

3. Laser Output Control Method

The following will explain a method (laser output control method) of controlling the laser output of the laser ignition device 11, the method being performed by the laser output control portion 53 of the ECU 50 in the embodiment of the present invention. In the present embodiment, when the contamination determining portion 52 determines by the contamination determining method (in any of Examples 1 to 4) that the laser ignition device 11 is contaminated, the laser output control portion 53 increases the laser output of the laser ignition device 11 to more than a reference laser output set when the laser ignition device 11 is not contaminated.

One example is that the laser output control portion 53 increases the laser output of the laser ignition device 11 to a laser output (hereinafter referred to as a "first laser output") by which even the contaminated laser ignition device 11 can surely ignite the air-fuel mixture. In this case, based on operating situations (engine load and the like) of the engine 1, the degree of the contamination of the laser ignition device 11 determined by the contamination determining portion 52 as above, and the like, the laser output control portion 53 calculates a laser output necessary for surely igniting the air-fuel mixture. Then, the laser output control portion 53 uses the obtained laser output as the first laser output.

In another example, the laser output control portion 53 increases the laser output of the laser ignition device 11 to a high laser output (hereinafter referred to as a "second laser output") by which the contamination of the laser ignition device 11 can be removed. When the laser beam is emitted from the laser ignition device 11 by the second laser output that is the high output, the stain attached to a portion (the lens 11d or the like) of the laser ignition device 11 which portion is located in the combustion chamber 5 absorbs light and combusts to be removed. In this case, since the second laser output is basically higher than the first laser output, the air-fuel mixture is surely ignited as with a case where the first laser output is used.

Specifically, based on the operating situations (engine load and the like) of the engine 1, the degree of the contamination of the laser ignition device 11 determined by the contamination determining portion 52 as above, and the like, the laser output control portion 53 calculates a laser output necessary for removing the contamination of the laser ignition device 11. Then, the laser output control portion 53 uses the obtained laser output as the second laser output. Further, while the laser beam is emitted from the laser ignition device 11 by the second laser output, the contamination determining portion 52 determines the contamination of the laser ignition device 11 at all times. Then, when the contamination determining portion 52 determines that the laser ignition device 11 is not contaminated, the laser output control portion 53 returns the laser output of the laser ignition device 11 from the second laser output to the reference laser output. To be specific, until the contamination of the laser ignition device 11 is removed, the laser output control portion 53 keeps on setting the laser output of the laser ignition device 11 to the second laser output. Then, when the contamination of the laser ignition device 11 is removed, the laser output control portion 53 returns the laser output of the laser ignition device 11 to the reference laser output.

It is preferable that before the compression self-ignition combustion is switched to the spark ignition combustion in the compression self-ignition gasoline engine, preliminary ignition is performed by the laser ignition device 11 using the second laser output. With this, the contamination generated in the laser ignition device 11 while performing the compression self-ignition combustion can be appropriately removed.

It should be noted that depending on the operating situations of the engine 1, the contamination of the laser ignition device 11 may be naturally removed without setting the laser output of the laser ignition device 11 to the second laser output. For example, in the operating situation in which a cylinder internal temperature becomes high, the contamination of the laser ignition device 11 may be naturally removed. Therefore, even when the first laser output lower than the second laser output is used, the contamination of the laser ignition device 11 may be removed. On this account, it is preferable that: even when the laser output of the laser ignition device 11 is set to the first laser output, the contamination determining portion 52 determines the contamination of the laser ignition device 11 at all times; and when the contamination determining portion 52 determines that the laser ignition device 11 is not contaminated, the laser output control portion 53 returns the laser output of the laser ignition device 11 from the first laser output to the reference laser output.

4. Control Flow

Figure 11:
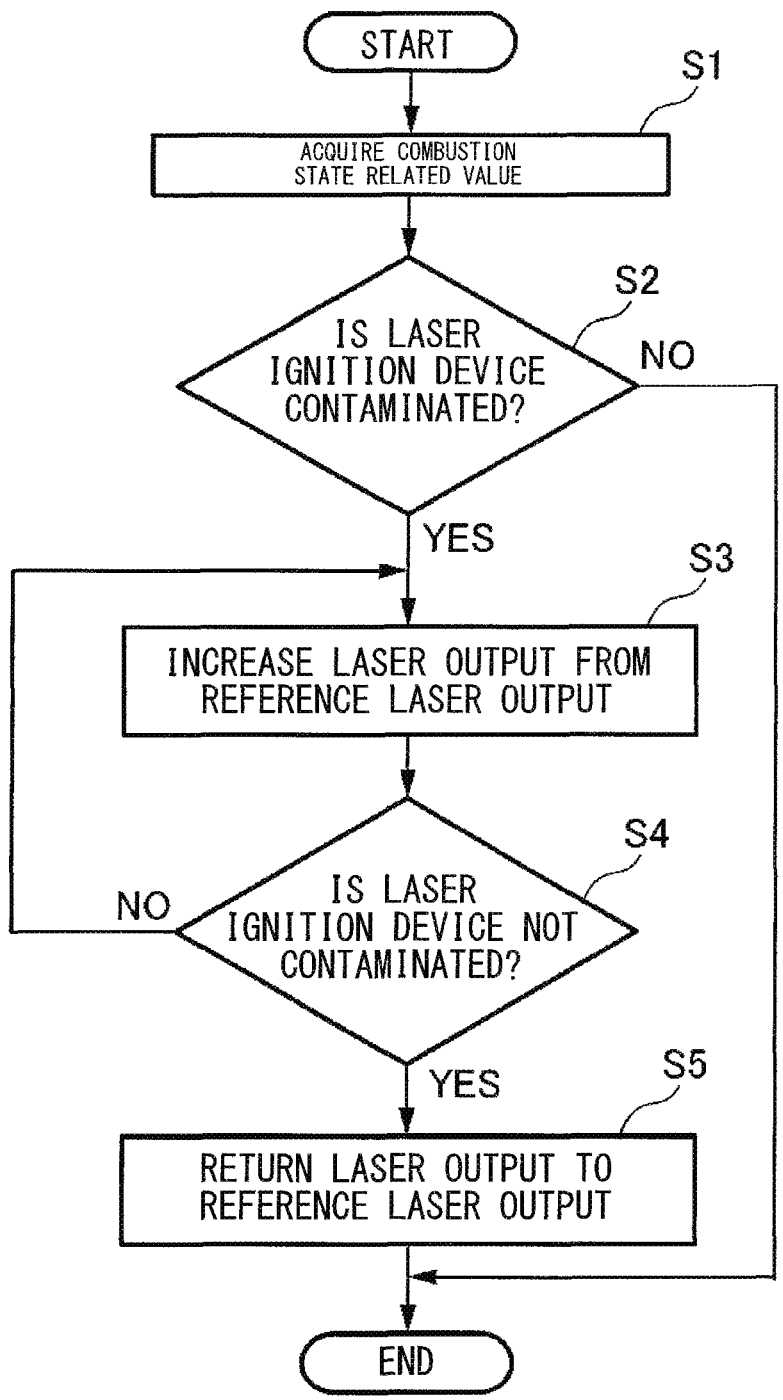
FIG. 11 is a flow chart showing a control flow according to the embodiment of the present invention.

Next, a control flow performed by the ECU 50 in the embodiment of the present invention will be explained in reference to FIG. 11. FIG. 11 is a flow chart showing the control flow according to the embodiment of the present invention. This flow is repeatedly executed by the ECU 50 at a predetermined cycle.

First, in Step S1, as the combustion state related value related to the combustion state of the engine 1, the combustion state related value acquiring portion 51 of the ECU 50 acquires at least one of the cylinder internal pressure, the ion current, and the crank angle signal. In this case, the combustion state related value acquiring portion 51 acquires the cylinder internal pressure (corresponding to the detection signal S31) from the cylinder internal pressure sensor 31, acquires the ion current (corresponding to the detection signal S33) from the ion current sensor 33, and acquires the crank angle signal (corresponding to the detection signal S35) from the crank angle sensor 35. Then, the process proceeds to Step S2.

In Step S2, the contamination determining portion 52 of the ECU 50 determines whether or not the laser ignition device 11 is contaminated. In this case, the contamination determining portion 52 performs any one of the contamination determining methods according to Examples 1 to 4 to determine whether or not the laser ignition device 11 is contaminated (see "2. Contamination Determining Method"). As a result, when the contamination determining portion 52 determines that the laser ignition device 11 is contaminated (Yes in Step S2), the process proceeds to Step S3. On the other hand, when the contamination determining portion 52 determines that the laser ignition device 11 is not contaminated (No in Step S2), the process terminates.

In Step S3, the laser output control portion 53 of the ECU 50 increases the laser output of the laser ignition device 11 from the reference laser output set when the laser ignition device 11 is not contaminated. One example is that the laser output control portion 53 increases the laser output of the laser ignition device 11 to the first laser output by which even the contaminated laser ignition device 11 can surely ignite the air-fuel mixture. In another example, the laser output control portion 53 increases the laser output of the laser ignition device 11 to the second laser output by which the contamination of the laser ignition device 11 can be removed. Then, the process proceeds to Step S4.

In Step S4, as with Step S2, the contamination determining portion 52 of the ECU 50 again determines whether or not the laser ignition device 11 is contaminated. As a result, when the contamination determining portion 52 determines that the laser ignition device 11 is not contaminated (Yes in Step S4), the process proceeds to Step S5. In this case, the laser output control portion 53 of the ECU 50 returns the laser output of the laser ignition device 11 to the reference laser output (Step S5). Then, the process terminates.

On the other hand, when the contamination determining portion 52 determines that the laser ignition device 11 is contaminated (No in Step S4), the process returns to Step S3. In this case, the laser output control portion 53 maintains the laser output that is set in Step S3 and higher than the reference laser output. Until the contamination determining portion 52 determines in Step S4 that the laser ignition device 11 is not contaminated, that is, until the contamination of the laser ignition device 11 is removed, the laser output control portion 53 maintains the laser output higher than the reference laser output.

5. Operational Advantages

Next, operational advantages of the controller of the laser ignition engine according to the embodiment of the present invention will be explained.

According to the present embodiment, in consideration that the combustion state of the engine 1 is different between when the laser ignition device 11 is contaminated and when the laser ignition device 11 is not contaminated, whether or not the laser ignition device 11 is contaminated is determined based on the combustion state related value related to the combustion state (such as the cylinder internal pressure, the ion current, and the crank angle signal) of the engine 1. Therefore, the contamination of the laser ignition device 11 can be accurately determined. Further, according to the present embodiment, in consideration that the laser ignition device 11 tends to be contaminated when the compression self-ignition combustion is performed in the compression self-ignition gasoline engine, whether or not the laser ignition device 11 is contaminated is determined based on the history of the compression self-ignition combustion performed. Therefore, the contamination of the laser ignition device 11 can be accurately determined.

Thus, according to the present embodiment, the countermeasure against the contamination of the laser ignition device 11 can be taken at an appropriate timing, and wasteful energy consumption can be suppressed. Specifically, the control operation of increasing the laser output of the laser ignition device 11 to more than the reference laser output can be executed only when the laser ignition device 11 is contaminated, and therefore, the energy consumption caused by increasing the laser output can be suppressed.

Further, according to the present embodiment, when it is determined that the laser ignition device 11 is contaminated, the laser output of the laser ignition device 11 is increased to the first laser output. With this, the air-fuel mixture can be surely ignited even by the contaminated laser ignition device 11. In addition, according to the present embodiment, when it is determined that the laser ignition device 11 is contaminated, the laser output of the laser ignition device 11 is increased to the second laser output. With this, the contamination of the laser ignition device 11 can be appropriately removed.

Further, according to the present embodiment, while the laser beam is emitted from the laser ignition device 11 by the second laser output, the contamination of the laser ignition device 11 is determined at all times. Then, when it is determined that the laser ignition device 11 is not contaminated, the laser output is returned from the second laser output to the reference laser output. Therefore, the energy consumption caused by continuously using the second laser output can be suppressed.

LIST OF REFERENCE CHARACTERS

1 engine
3 intake passage
5 combustion chamber
9 fuel injection valve
11 laser ignition device
11*d* lens
13 piston
17 crank shaft 21 exhaust passage
31 cylinder internal pressure sensor
33 ion current sensor
35 crank angle sensor
50 ECU
51 combustion state related value acquiring portion
52 contamination determining portion
53 laser output control portion

The invention claimed is:

1. A controller of a laser ignition engine configured to perform ignition by using a laser ignition device configured to emit a laser beam condensed by a lens, the controller comprising a contamination determining portion configured to determine whether or not the laser ignition device is contaminated, wherein:

the engine is a compression self-ignition gasoline engine configured to perform compression self-ignition combustion that is combustion by self-ignition of an air-fuel mixture in a predetermined first operation range and perform spark ignition combustion that is forced combustion by ignition of the laser ignition device in a second operation range different from the first operation range; and when the engine performs the compression self-ignition combustion continuously for a predetermined time or more, the contamination determining portion determines that the laser ignition device is contaminated.

* * * * *